US012154606B2

(12) United States Patent
Knigge et al.

(10) Patent No.: US 12,154,606 B2
(45) Date of Patent: Nov. 26, 2024

(54) DATA STORAGE DEVICE WITH MAPPING AND MITIGATION OF LASER MODE HOP EFFECTS IN HEAT-ASSISTED MAGNETIC RECORDING (HAMR)

(71) Applicant: WESTERN DIGITAL TECHNOLOGIES, INC., San Jose, CA (US)

(72) Inventors: Bernhard E. Knigge, San Jose, CA (US); Phillip S. Haralson, Huntington Beach, CA (US); Naoto Ito, Fujisawa (JP); Derrick Burton, Ladera Ranch, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 18/232,041

(22) Filed: Aug. 9, 2023

(65) Prior Publication Data
US 2024/0177735 A1    May 30, 2024

Related U.S. Application Data

(60) Provisional application No. 63/428,913, filed on Nov. 30, 2022.

(51) Int. Cl.
G11B 11/105    (2006.01)
G11B 5/48    (2006.01)
(Continued)

(52) U.S. Cl.
CPC .......... G11B 7/1263 (2013.01); G11B 5/4866 (2013.01); G11B 5/607 (2013.01);
(Continued)

(58) Field of Classification Search
CPC ... G11B 7/1263; G11B 5/455; G11B 7/00456; G11B 7/1267; G11B 7/00458;
(Continued)

(56) References Cited

U.S. PATENT DOCUMENTS 8,767,339 B2    7/2014    Zeng et al.
8,902,718 B1    12/2014    Ruan et al.
(Continued)

OTHER PUBLICATIONS

Liang, Hongliang (Joe), "Integrated HAMR Light Delivery System via High Q Resonators," https://kilthub.cmu.edu/downloader/files/13304183, Aug. 2018, 195 pages.

*Primary Examiner* — Nabil Z Hindi
(74) *Attorney, Agent, or Firm* — Calderon Safran & Wright P.C.

(57) ABSTRACT

Various illustrative aspects are directed to a data storage device, comprising one or more disks; an actuator mechanism configured to position a selected head among one or more heads proximate to a corresponding disk surface among the one or more disks; and one or more processing devices. The one or more processing devices are configured to generate a map of laser mode hop effects across the corresponding disk surface, for the selected head. The one or more processing devices are further configured to apply a laser mode hop mitigation in operating the selected head, based on the map of laser mode hop effects.

19 Claims, 8 Drawing Sheets

(51) Int. Cl.
    *G11B 5/60*         (2006.01)
    *G11B 7/1263*       (2012.01)
    *G11B 13/04*        (2006.01)
    *G11B 5/00*             (2006.01)

(52) U.S. Cl.
    CPC .... *G11B 13/045* (2013.01); *G11B 2005/0018* (2013.01); *G11B 2005/0021* (2013.01)

(58) Field of Classification Search
    CPC ............ G11B 13/08; G11B 2005/0021; G11B 11/1051; G11B 11/105; G11B 5/00; G11B 5/6088; G11B 7/1387; G11B 5/4555; G11B 5/02
    USPC .......................................................... 360/59
    See application file for complete search history.

(56) References Cited

U.S. PATENT DOCUMENTS

| | | |
|---|---|---|
| 9,281,659 B1 | 3/2016 | Tatah et al. |
| 10,192,578 B1 * | 1/2019 | Macken ................. G11B 5/012 |
| 10,410,668 B1 | 9/2019 | Macken et al. |
| 10,997,997 B1 * | 5/2021 | Xiong .................. G11B 7/1267 |
| 2015/0340053 A1 | 11/2015 | Peng et al. |
| 2016/0087401 A1 | 3/2016 | Wessel et al. |
| 2017/0162222 A1 | 6/2017 | Matousek et al. |
| 2017/0323657 A1 | 11/2017 | Ruan et al. |
| 2018/0233171 A1 | 8/2018 | Tatah et al. |
| 2021/0383831 A1 | 12/2021 | Wessel et al. |

\* cited by examiner

DATA STORAGE DEVICE WITH MAPPING AND MITIGATION OF LASER MODE HOP EFFECTS IN HEAT-ASSISTED MAGNETIC RECORDING (HAMR)

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

SUMMARY

Various examples disclosed herein provide data storage devices such as hard disk drives with control circuitry that may mitigate and resolve data write anomalies and errors due to laser mode hops in heat-assisted magnetic recording (HAMR) disk drives. Laser mode hops are sudden changes in laser amplitude during the HAMR write operations. Among the inventive insights of this disclosure, it is found that an individual HAMR head operating over its corresponding disk surface, performing the same write operations in the same sectors under the same operating conditions, often exhibits predictable laser mode hop effects at the same positions of the disk surface, or the same amount of time into the write operation. In aspects of this disclosure, control circuitry of a disk drive performs a mapping of these predictable laser mode hops and/or their effects across the disk surface, and for different write operations at different operating conditions. The control circuitry may then determine effective or optimal mitigations to apply to each mapped laser mode hop effect in its generated map of laser mode effects, such as modifications to current or power applied to the laser, to the write element, or to thermal fly height control (TFC) elements of the head. In various aspects of this disclosure, the control circuitry may apply those laser mode hop mitigations to the head during operation, thereby mitigating or counteracting the laser mode hop effects, mitigating or resolving the data write errors, and enabling substantially higher quality HAMR data write operations.

Various illustrative aspects are directed to a data storage device, comprising one or more disks; an actuator mechanism configured to position a selected head among one or more heads proximate to a corresponding disk surface among the one or more disks; and one or more processing devices. The one or more processing devices are configured to generate a map of laser mode hop effects across the corresponding disk surface, for the selected head. The one or more processing devices are further configured to apply a laser mode hop mitigation in operating the selected head, based on the map of laser mode hop effects.

Various illustrative aspects are directed to a method comprising generating, by one or more processing devices, for a selected head of a data storage device operating proximate to a corresponding disk surface, a map of laser mode hop effects across the corresponding disk surface. The method further comprises applying, by the one or more processing devices, a laser mode hop mitigation in operating the selected head, based on the map of laser mode hop effects.

Various illustrative aspects are directed to one or more processing devices comprising means for generating a map of laser mode hop effects for a selected head operating across a corresponding disk surface of a data storage device, and across a range of operating conditions of the selected head. The one or more processing devices further comprise means for determining a set of mitigation parameter modifications relative to positions of the disk surface, based on the map of laser mode hop effects. The one or more processing devices further comprise means for applying a laser mode hop mitigation in operating the selected head at a selected position, among the positions of the disk surface, based on the set of mitigation parameter modifications relative to positions of the disk surface.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 1:
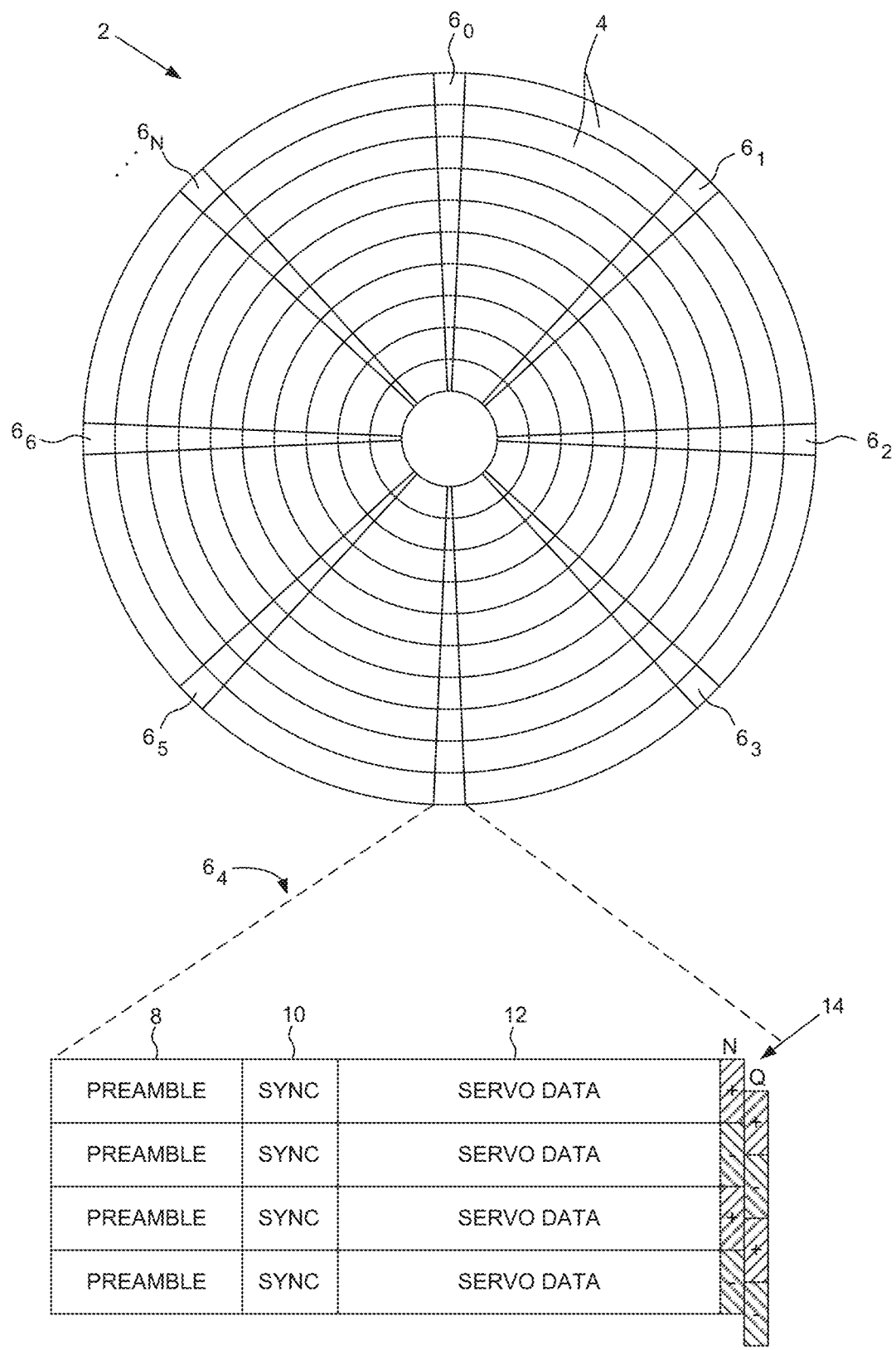
FIG. 1 shows a prior art disk format as comprising a number of radially-spaced, concentric servo tracks defined by servo wedges recorded around the circumference of each servo track.
Figure 2:
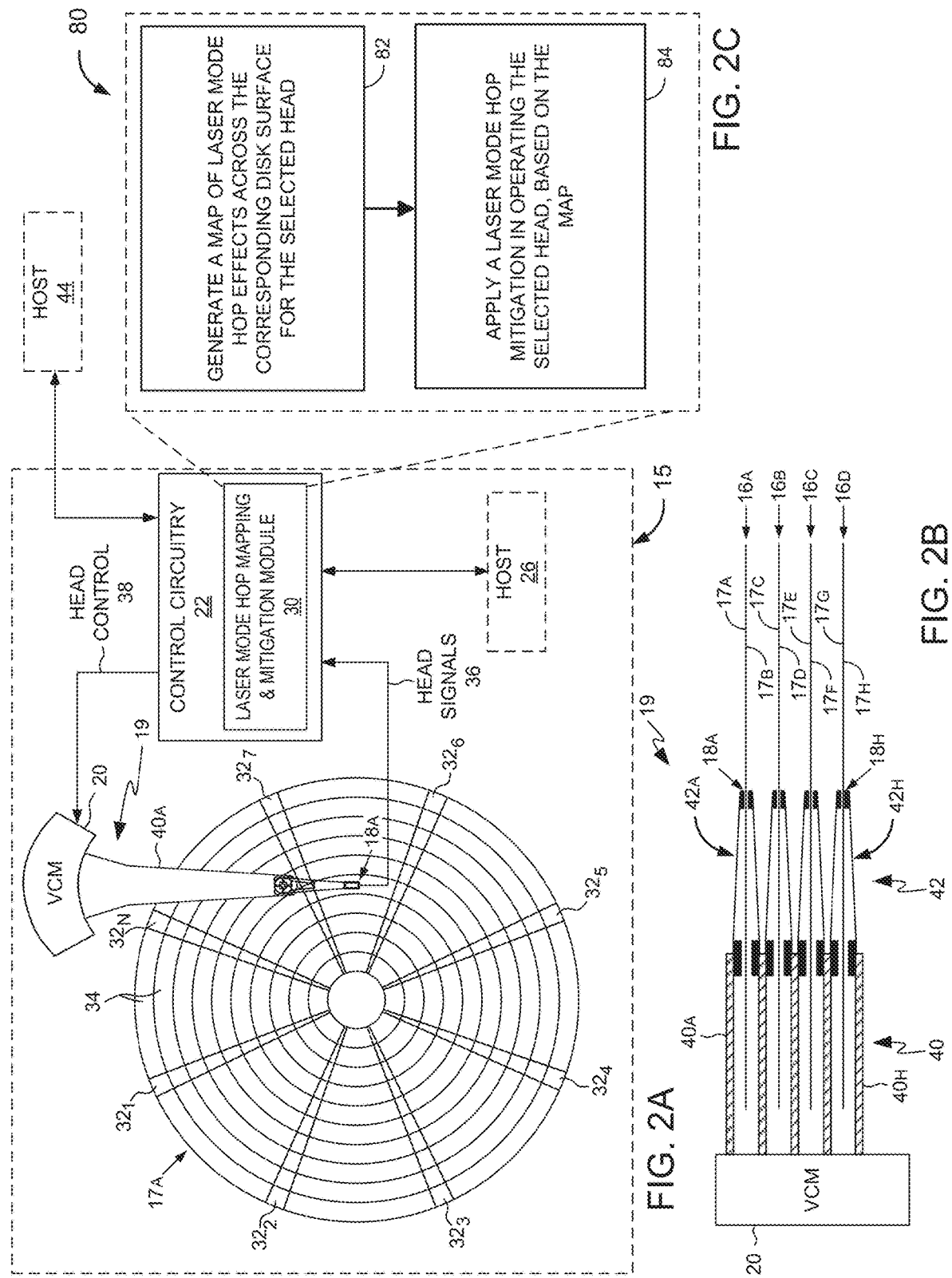
FIGS. 2A and 2B illustrate conceptual block diagrams of a top view and a side view of a data storage device in the form of a disk drive, in accordance with aspects of the present disclosure.
FIG. 2C depicts a flowchart for an example method that control circuitry of a disk drive may perform or execute in controlling the operations of the disk drive, including for generating a map of laser mode hop effects and applying laser mode hop mitigations based on the map, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("disks 16"). FIG. 2C depicts a flowchart for an example method 80 that control circuitry 22 of disk drive 15 may perform or execute in controlling the operations of disk drive 15, including for generating a map of laser mode hop effects and applying laser mode hop mitigations based on the map, in accordance with aspects of the present disclosure. Such operations that control circuitry 22 of disk drive 15 may implement and embody include operations involved in detecting and mapping laser mode hopping with respect to position of each head of disk drive 15 over each head's corresponding disk surface of disks 16, and relative to operating parameters or other operating conditions, such as temperature and laser power, in various examples in accordance with aspects of the present disclosure. Such operations that control circuitry 22 of disk drive 15 may implement and embody further include operations involved in mitigating laser mode hops and/or laser mode hop effects, including avoiding laser mode hops, or intelligently navigating laser mode hops to avoid their deleterious effects, in various examples in accordance with aspects of the present disclosure.

Operating conditions include operating parameters, which are directly controllable by control circuitry 22, such as current or power applied to any element of a head 18, and any other operating conditions, which may or may not be related to the operating parameters, such as temperature of a head 18 or portion thereof or of the interior ambient environment of disk drive 15. "Current" may be considered to indicate current, power, or any other parameterization of providing current or power to any element, and these terms may be used interchangeably herein, with the understanding of how they relate to each other.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples. Each suspension assembly 42 suspends a slider at a distal end thereof, with one of read/write heads 18 ("heads 18") mounted on the slider.

Each of actuator arms 40 is thus configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples. Control circuitry 22 may be operatively in communicative and/or control connection or coupling with a host 44, which may include any external processing, computing, and/or data management entity, such as a computing device, a storage area network, a data center, a cloud computing resource of any kind, and/or any other kind of host, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks, or ten or eleven or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads 18 radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples. An actuator mechanism such as actuator arm assembly 19 may thus be configured to position heads 18, including a selected head among one or more heads 18, proximate to a corresponding disk surface 17 among the one or more disks 16.

In executing example method 80 of FIG. 2C (aspects of which are also further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, for each of one or more heads 18, for a selected head 18 operating over a corresponding disk surface 17, control circuitry 22 may be configured to generate a map of laser mode hop effects across the corresponding disk surface 17, for the selected head 18 (82). Control circuitry 22 may be configured to apply a laser mode hop mitigation in operating the selected head 18, based on the map of laser mode hop effects (84). Control circuitry 22 may further perform additional actions, methods, and techniques, in accordance with various aspects including as further described herein.

Figure 3:
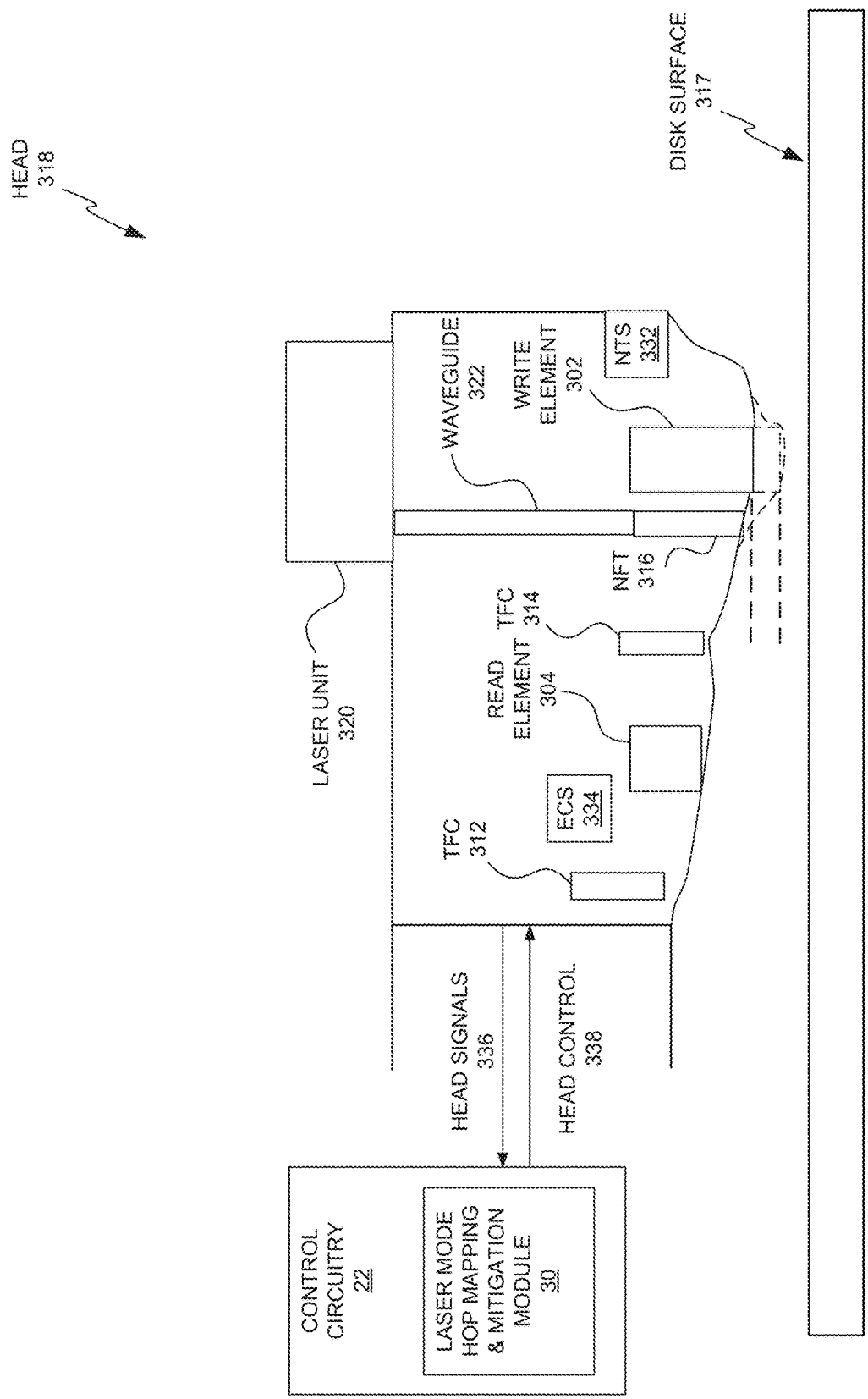
FIG. 3 depicts a conceptual side view diagram of a head of a disk drive, suspended above and operating proximate to a corresponding disk surface, under control of control circuitry including a laser mode hop mitigation and mapping module, in accordance with aspects of this disclosure.

FIG. 3 depicts a conceptual side view diagram of a head 318 of a disk drive, suspended above and operating proximate to a corresponding disk surface 317, and demonstrating changes in protrusion and aerodynamic profile causing changes in fly height due to laser mode hop (among the complex effects of laser mode hope which also include changes in laser amplitude and write strength or write amplitude), and operation of laser mode hop mitigation and mapping module 30 of control circuitry 22 in controlling head 318, in accordance with aspects of this disclosure. Head 318 and corresponding disk surface 317 may be an example of one of heads 18 and corresponding disk surfaces 17 as shown in FIGS. 2A and 2B. FIG. 3 is a conceptual diagram and not an engineering schematic, and the elements depicted may be disposed in any of a variety of arrangements in different examples.

Control circuitry 22 outputs head control signals 338 to head 318, and receives head signals 336 (including control signals and data) from head 318. Head 318 includes a write element 302, a read element 304, thermal fly height (TFC) control elements 312 and 314, a laser unit 320 configured for emitting a laser via waveguide 322 and near-field transducer (NFT) 316, which induces a plasmon that heats a track on disk surface 317 that passes proximate to write element 302. Head 318 further includes near-field transducer thermal sensor (NTS) 332, which measures temperature proximate to NFT 316 and write element 302, and embedded contact sensor (ECS) 334, which measures temperature proximate to read element 304. Since laser heating is localized proximate to NFT 316 and write element 302, including sudden changes in laser heating due to laser mode hops, NTS 332 is well-suited for measuring changes in temperature due to laser heating and laser mode hops, while ECS 334 is positioned farther away from the path of the laser and is relatively insulated from changes in temperature due to laser mode hops.

Control circuitry 22 writes data to disk surface 317 by modulating a write current in an inductive write coil in write element 302, to record magnetic transitions onto corresponding disk surface 317 in a process referred to as saturation recording. During read-back, read element 304 (e.g., a magneto-resistive element) in head 318 senses the magnetic transitions, and a read channel demodulates the resulting read signal. Heat-assisted magnetic recording (HAMR) enables high-quality written data at high densities enabled by a high-coercivity medium, by heating the disk surface 317 during write operations in order to decrease the coercivity of the magnetic medium, thereby enabling the magnetic field generated by the write coil to magnetize the temporarily heated area of disk surface 317. The disk surface encoding the data thus written then cools back down and thereby returns to heightened magnetic coercivity which preserves the durability of the written data at higher density than is possible in conventional techniques such as perpendicular magnetic recording (PMR). Any suitable technique may be employed to heat the surface of the disk in HAMR recording, such as with a laser diode in laser unit 320 and NFT 316 disposed proximate to other write components of head 318. Since the quality of the write/read signal depends on the fly height of head 318, head 318 may also comprise one or more fly height actuators (FHA) for controlling or influencing the fly height. Any type of fly height actuator may be employed, such as TFCs 312, 314 as in the example of FIG. 3, which control or influence fly height of head 318 above disk surface 317 through thermal expansion, or a piezoelectric (PZT) actuator (not included in the example of FIG. 3) that actuates through mechanical deflection, or other FHA embodiments, in other examples.

When control circuitry 22 applies current (or equivalently, power in any form) to laser unit 320 during write operations, laser unit 320 may exhibit sudden changes between two or more available modes of laser emission, due to complex diode laser emission physics effects. Such sudden changes in laser emission modes cause transients, or sudden shifts in magnitude, in output power or amplitude of the laser being emitted by laser unit 320. This phenomenon is known as laser mode hopping. Because such laser mode hopping can create sudden, unpredictable changes in the laser amplitude that heats an area of disk surface 317 to be written to via write element 302, laser mode hopping may also cause sudden, unpredictable write width changes, even while the write current applied to write element 302 remains constant. That is, a greater or lesser track width across disk surface 17 may be susceptible to being written to, by the constant write current, in response to the laser suddenly becoming more or less powerful, respectively. The laser amplitude in terms of the amplitude of the laser that is emitted may thus differ significantly from that expected by the laser current (which may be parameterized as power or as current or otherwise) that control circuitry 22 applies to laser unit 320.

Laser mode hops can also cause sudden changes in thermal expansion effects and thermal protrusion in the area of head 318 proximate to NFT 316 and write element 302 (illustratively depicted in dashed lines), which may also have complex effects on the aerodynamics of head 318, which in turn may also have complex effects on fly height and write strength. In some examples, unmitigated laser mode hops have been observed to induce sudden changes in fly height, and are at least a major contributor to total fly height variation in HAMR disk drives. Unmitigated laser mode hop effects on write strength and on other involved performance characteristics such as fly height have posed a substantial challenge in advancing the performance of HAMR drives.

Inventive aspects of this disclosure include the novel insight that laser mode hops have been found to be deterministic at given sets of operating parameters, including drive temperature and write and laser currents. Should the laser drop in amplitude due to a mode hop by, e.g., a few percent, control circuitry 22 may maintain the recording performance by changing the write current and and/or the TFC current (e.g., to increase both). Control circuitry 22 may also "push out" mode hops from or along a track by gradually reducing the laser current—which would otherwise result in a narrower track, but which control circuitry 22 may then compensate for by, e.g., increasing TFC and/or write current. See, e.g., FIG. 5, which shows track write operation temperature curve 505, described below. Furthermore, control circuitry 22 may minimize mode hop frequency by first stabilizing the laser diode temperature prior to performing a write operation. Stabilizing the laser diode temperature may take anywhere from one to several sector IDs (SIDs, sectors) to many revolutions. Control circuitry 22 may facilitate or accomplish stabilized laser diode temperature by choosing higher pre-bias laser current and/or longer laser pre-bias times, e.g., of anywhere from 1 SID to several revolutions, in different examples.

When such changes in write strength and write width are applied to data tracks, they can cause write strength variation, write distortion, and adjacent track interference (ATI). The majority of laser mode hops are found to suddenly decrease rather than increase the laser power and therefore the write strength, such that write strength may fall below nominal, and data may not be written reliably, if laser mode hops are not mitigated in accordance with aspects of this disclosure. On the other hand, sudden increases in write strength induced by laser mode hops may cause excessive adjacent track interference (ATI) and erode or ruin data written on adjacent tracks. When such changes in write strength and write width are applied to servo control features, laser mode hopping may cause distortion of servo patterns in a servo wedge 32, if laser mode hops are not mitigated in accordance with aspects of this disclosure. Such distortion of the servo patterns may be referred to as DC bi-modal distortion, and may result in degraded operational issues of disk drive 15 such as DC squeeze (also called track squeeze) and/or large repeatable runout (RRO) error. Laser mode hopping is thus an undesirable characteristic of HAMR systems. Laser mode hopping has proven difficult to predict, eliminate, or mitigate.

Accordingly, aspects of the present disclosure are directed to systems and methods that inventively determine predictable aspects of what had been considered to be unpredictable laser mode hop effects in a HAMR disk drive, and inventively take advantage of, avoid, or otherwise mitigate impacts of laser mode hopping, among other inventive advantages. Laser mode hop mapping and mitigation module 30 controls head 318 to map predictable laser mode hop effects across disk surface 317, and to take advantage of, avoid, or otherwise mitigate impacts of laser mode hops, as further discussed as follows.

Figure 4:
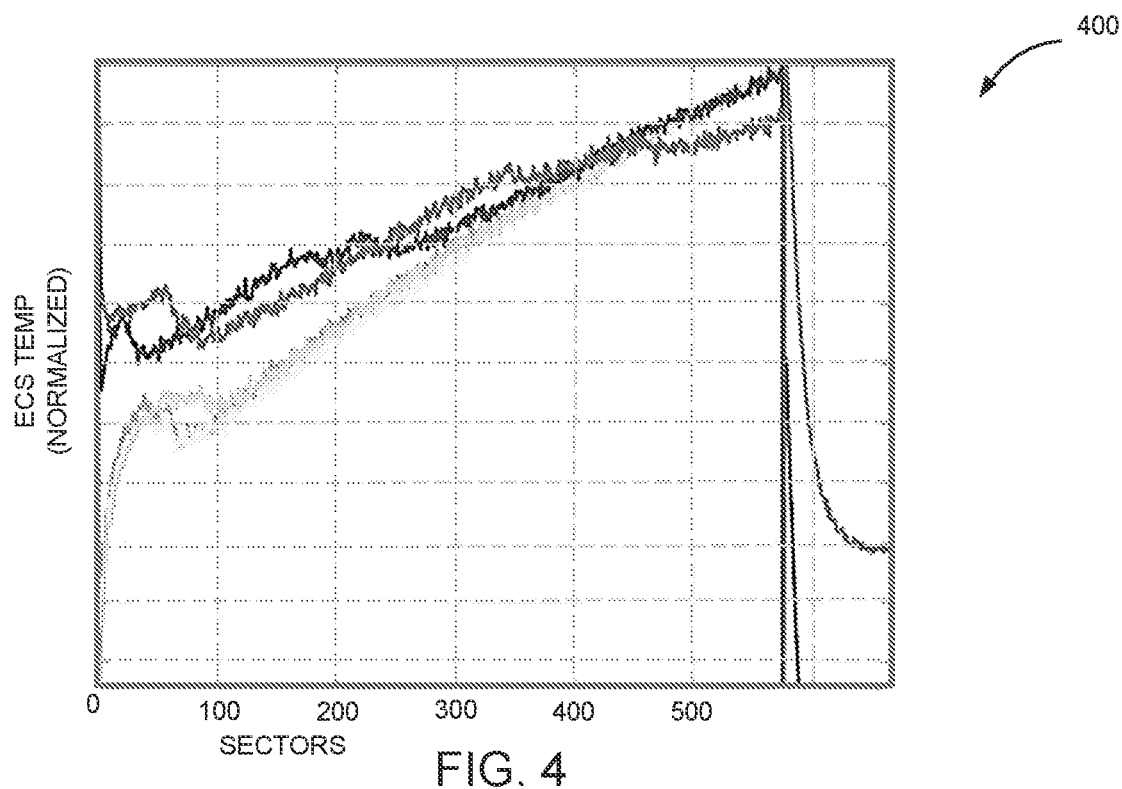
FIG. 4 depicts a graph of temperature curves as measured by an embedded contact sensor (ECS) proximate to the read element of the head for five different radii/tracks with the same head over sector positions along a track on a disk surface, over the course of a long, continuous write operation on each track, in accordance with aspects of this disclosure.

FIG. 4 depicts a graph 400 of temperature curves as measured by an ECS proximate to the read element of the head for each of five example tracks, over sector positions along a track on a disk surface, over the course of five long, continuous write operations of the head on each of the five tracks, in accordance with aspects of this disclosure. Graph 400 shows temperature along the y axis (in normalized, custom units) and concentric sectors along a track of the disk surface along the x axis, following a write operation to one track for one full revolution of the disk. Graph 400 shows approximately linear increase in head temperature over time, and an absence of laser mode hop effects, proximate to the read element, and some minor differences in temperature and in rate of change in temperature over radial distance, but fairly uniform behavior for the head for all five example tracks as a basis of comparison, in accordance with aspects of this disclosure.

Figure 5:
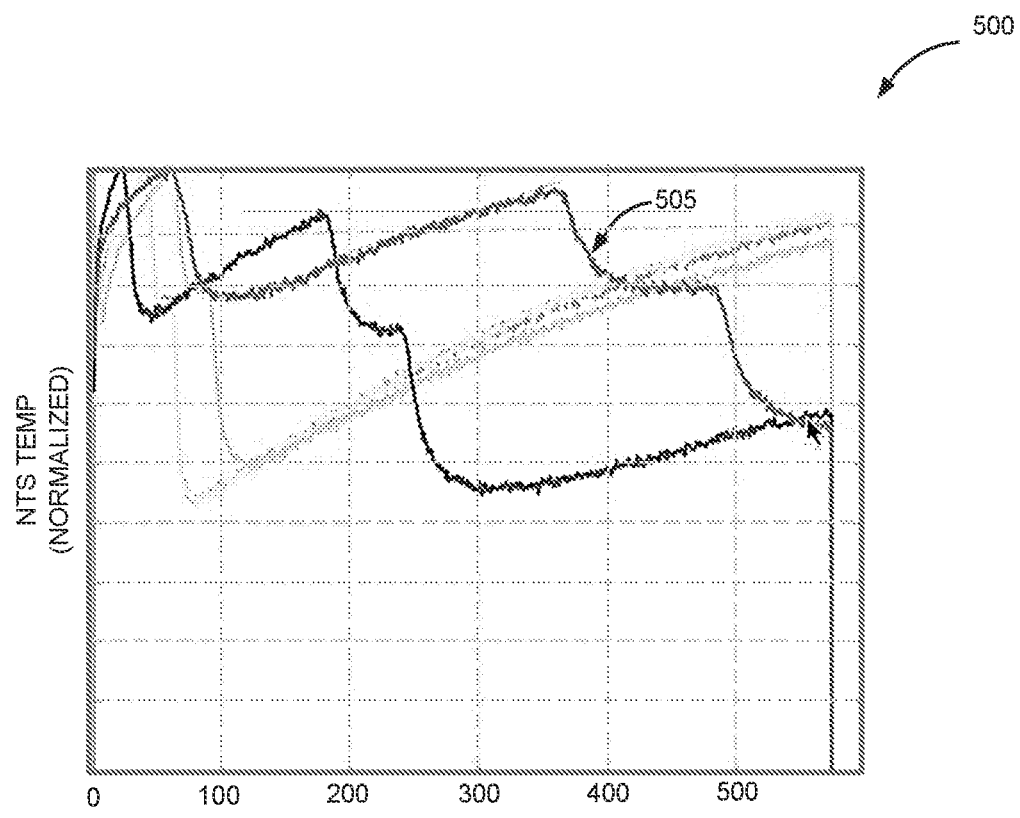
FIG. 5 depicts a graph of temperature curves for each of the same five radii as in FIG. 4, of temperature over the same sector positions on the respective corresponding disk surfaces, as measured by a near-field transducer thermal sensor (NTS) proximate to the near-field transducer (NFT) and write element of the head, over the course of the same long, continuous write operation on each track, in accordance with aspects of this disclosure.

FIG. 5 depicts a graph 500 of temperature curves for each of the same five example tracks written by the head as in FIG. 4, of temperature (along the y axis, in the same normalized, custom units) over the same sector positions (along the x axis) along the same tracks on the respective corresponding disk surfaces, as measured by the NTS proximate to the NFT and write element of the head, over the course of the same full-revolution continuous write operation of the head, in accordance with aspects of this disclosure. Graph 500 shows substantial and heterogeneous effects, across the different example write operations of different tracks, of laser mode hop on temperature proximate to the NFT and write element of each respective head, and indicative of other potentially disruptive effects of laser mode hop, prior to mitigation, in accordance with aspects of this disclosure.

Laser mode hop causes significant variation in temperature proximate to the write element of the head, as shown by FIGS. 4 and 5 and the contrast between them. FIG. 4 shows readings of temperature proximate to the read element of the head (read by the ECS of the head, disposed proximate to the read element), for five different radii, over the course of a continuous write operation of each head for one full revolution of the corresponding disk surfaces. Temperature proximate to the NFT and write element is typically an accurate proxy for write strength, or at least prior to other optimizations. As FIG. 4 shows, in each case, the temperature begins with relatively more complex and heterogeneous behavior, before settling down into an approximately linear rise over time. The ECS/NTS differential signal provides further improvement in signal-to-noise noise ratio for the relevant temperature for detection of mode hops.

In contrast, FIG. 5 shows readings of temperature proximate to the write element of the head (read by the NTS of the head, disposed proximate to the write element), in the same head performing the same five representative track writes over the course of the same continuous write operations for the head over the same one full revolution of the corresponding disk surface. As FIG. 5 shows, the temperature shows a general trend of increase over time, but also shows at least one substantial and more sudden drop in each individual track write temperature curve, which is due to laser mode hop, and which is localized to the vicinity of the NFT, NTS, and write element. Some of the track write operations show a single rapid sequence of laser mode hops over the course of the revolution, followed by an approximately linear increase in temperature, free of laser mode hop effects, for the remaining majority of the write operation, while others show several interspersed laser mode hops. Each of the track write operations demonstrates at least one laser mode hop early in the write operation, during the interval of greatest change in temperature (early on after the laser has begun operation, before much time to approach thermal equilibrium), while some track write operations settle into an approximately linear rise after the early portion of the revolution for the remainder of the write operation, and other heads experience further laser mode hops at intervals throughout the write operation. Individual track write operations by the same head may thus vary quite substantially in their individual laser mode hop behavior, and in individual susceptibility to sudden changes in fly height, which have previously been unpredictable and uncontrollable, and which may be addressed or resolved in accordance with inventive aspects of the present disclosure.

The NTS is thus well-suited to detect and measure laser mode hop effects as manifested in the temperature of the vicinity of the head proximate to the NFT and write element. In some examples, a function of both NTS and ECS readings may be used for these purposes. For example, control circuitry 22 may read and measure a differential reading based on the NTS and the ECS, such as the NTS reading minus the ECS reading. In some examples, the ECS reading is affected by some of the same noise as the NTS reading, while being relatively insulated or isolated from local temperature changes due to laser mode hop, such that the differential reading of NTS minus ECS enables determination of laser mode hop effects and generating a map of laser mode hop effects with higher signal-to-noise resolution (SNR) than other measurement means such as NTS reading alone, in various aspects of this disclosure.

As track write operation temperature curve 505 shows, in tracks proximate to the OD, a major mode hop occurs fairly late in the revolution. In one example mitigation, control circuitry 22 may reduce the laser current, causing this mode hop to be pushed rightward in graph 500 enough to push it completely out of graph 500, that is, to avoid the mode hop altogether throughout the revolution. Control circuitry 22 may also raise the TFC power to lower the fly height to compensate for the lower laser power and maintain nominal track width, in this example.

Figure 6:
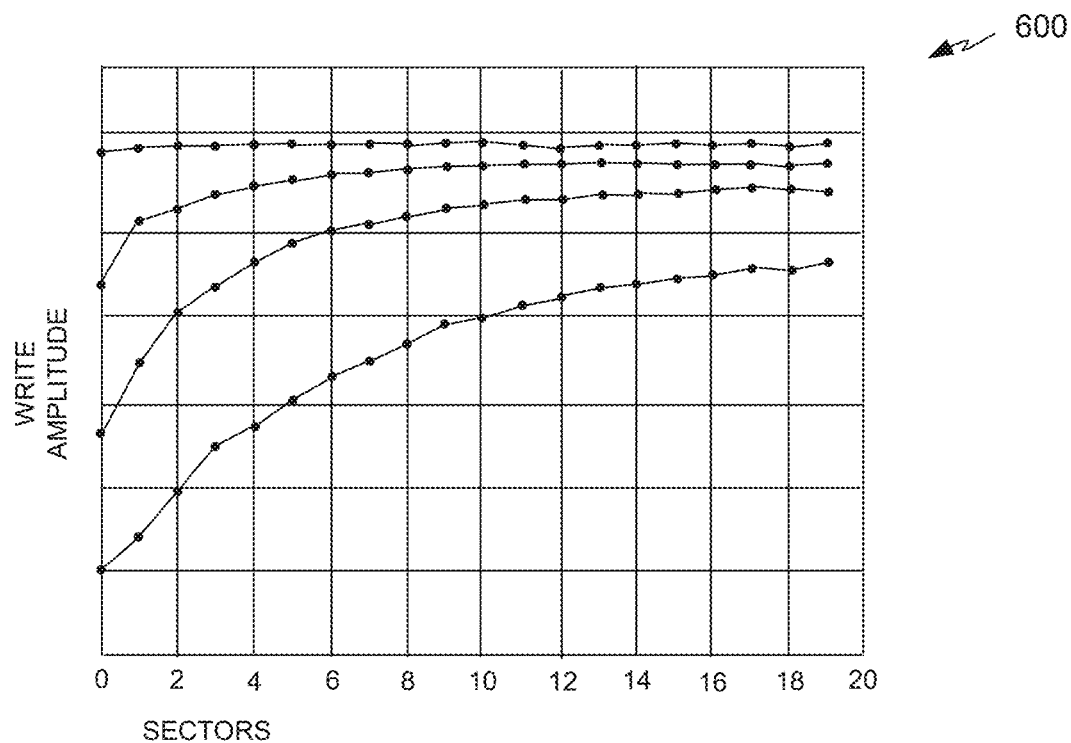
FIG. 6 shows a graph of measured write strength of one example head at four different thermal fly height control (TFC) output levels, across sectors of a track on a disk surface in a continuous write operation, in an example head that has an absence of laser mode hop effects in the applicable operating conditions in this write operation, as a basis of comparison, in accordance with aspects of this disclosure.
Figure 7:
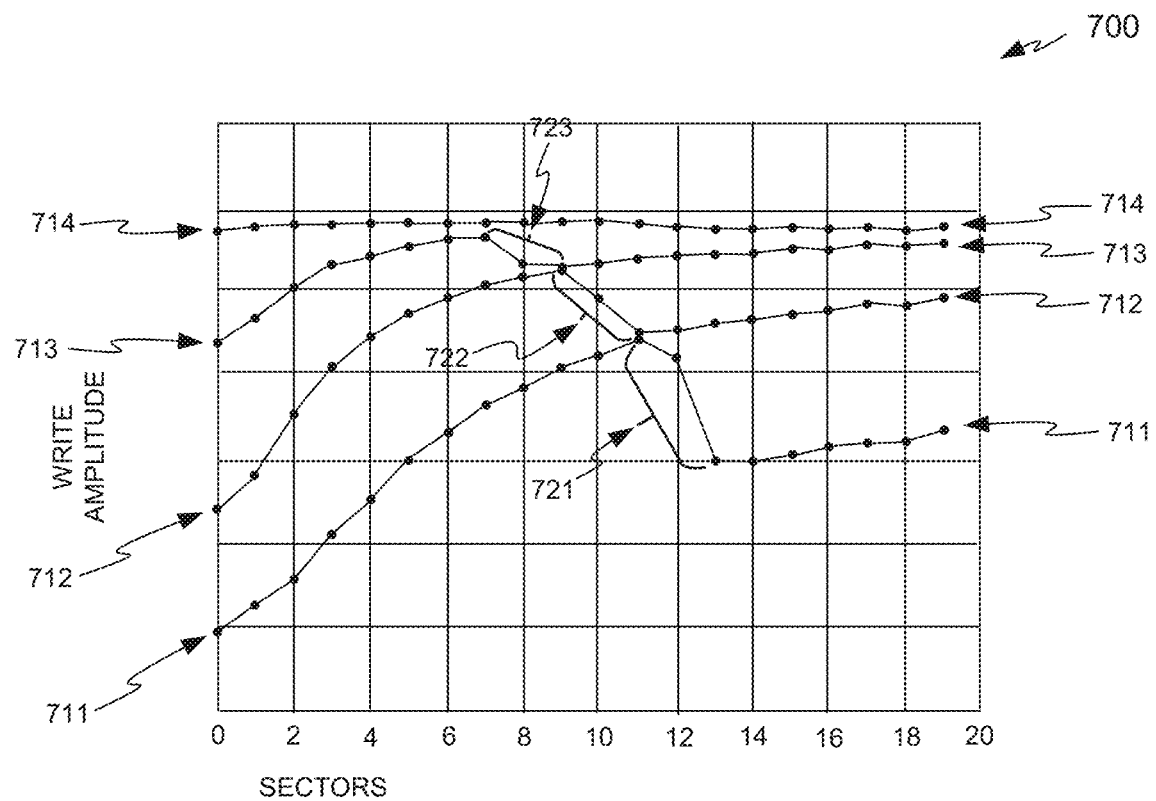
FIG. 7 shows a graph of measured write strength of another example head at the same four different TFC power levels, in which the head has significant laser mode hop effects in this write operation, other than at the highest TFC power level tested, in accordance with aspects of this disclosure.

FIGS. 6 and 7 representatively show the contrast in that some heads in some write operations and some operating conditions may or may not demonstrate laser mode hop effects, in accordance with aspects of this disclosure. FIG. 6 shows a graph 600 of measured write strength of one example head at four different thermal fly height control (TFC) output levels, i.e., amplitudes of current applied to the TFC units of the head (along the y axis, in custom units), across sectors of a track on a disk surface (along the x axis) in a continuous write operation for 20 sectors, in an example head that has an absence of laser mode hop effects in the applicable operating conditions in this write operation, as a basis of comparison, in accordance with aspects of this disclosure. (Power amplitude applied to the TFC may be referred to as TFC power, TFC current, or TFC level, and may be applied and/or parameterized in terms of power, current, voltage, or any other suitable variable.) TFC output corresponds to controlling the fly height to be reduced, or flying the head closer to the disk surface; the higher the TFC power, the lower the fly height and the higher the write strength, with other parameters and conditions equal, and absent more complex effects due to laser mode hop. Laser mode hop mapping and mitigation module 30 may map the absence of laser mode hop effects in these sectors of this track under the applied operating conditions, as part of generating a map of laser mode hop effects, and may record directions to refrain from applying laser mode hop mitigations in these positions and operating conditions in the map, in accordance with aspects of this disclosure.

FIG. 7 shows a graph 700 of measured write strength of another example head at the same four different TFC power levels, in which the head has significant laser mode hop effects in this write operation, other than at the highest TFC power level tested, in accordance with aspects of this disclosure, which are in contrast to the example of FIG. 6, free of laser mode hop effects. In each case, for the write strength curves at each TFC power level in both FIGS. 6 and 7, for each head, the write strength was measured for performing burst write scheme (BWS) servo write operations along the same twenty sectors of the same track.

The graphs of both of FIGS. 6 and 7 are based on data averaged over several 20-sector-long continuous write operations, each respectively for the same head operating over the same track, and which showed some but not much variation from each individual operation to the next in the set of operations that are averaged in FIGS. 6 and 7. As both FIGS. 6 and 7 show, other than when operating at the high end of TFC power, the heads show a general trend of write strength rising over time during the 20-sector-long continuous write operation. While the applicable physics is complex, this may likely be due to temperature of the write element rising over time during a long write operation. This may also be due at least in part to general rise in temperature of the head or portions thereof over time, as may manifest in several complex effects.

In FIG. 6, in the head that operates free of laser mode hop in this write operation in this track, at each TFC power level, the write strength rises approximately asymptotically over time. In contrast, FIG. 7 shows, at each TFC power level, the general rise in temperature over the course of the 20-sector write is interrupted by a substantial drop, intermediate in the course of the write operation, before the rise is resumed, due to mode hop of the laser unit. The higher the TFC power, the earlier the laser mode hop occurs, in this example. More generally, write strength may either suddenly drop or suddenly rise in event of a laser mode hop, although a drop in write strength is more common.

The write strength curves of FIG. 7 may thus be compared with the different but related temperature curves of FIG. 5, while whereas FIG. 5 shows temperature curves of a head writing five different tracks, for write operations over a full revolution around the entire track, FIG. 7 shows write strength curves of a head at four different TFC levels, and over a shorter write operation (for 20 consecutive sectors in an example track with 576 sectors in its full radial length, or diameter). FIG. 7 is focused on the effects of a single laser mode hop that predictably occurs for this head, at a similar but significantly different radial position along the track, depending on the TFC level. The higher the TFC level, the earlier along the track the laser mode hop occurs. Again, the physics involved in prompting the laser mode hop is complex, but this may be due to more quickly rising temperature of the head, due to higher TFC power, inducing mode hop in the laser diode relatively earlier in time.

In particular, in FIG. 7, for the first write strength curve 711 (at the lowest TFC level of the four in this example), the laser mode hop effect 721 manifests as a sudden drop in write strength from sectors 11 through 13; for the second write strength curve 712 (at the second TFC level of the four in this example), the laser mode hop effect 722 manifests as a sudden drop in write strength from sectors 9 through 11; and for the third write strength curve 713 (at the third TFC level of the four in this example), the laser mode hop effect 723 manifests as a sudden, relatively less significant drop in write strength from sectors 7 through 9. For the write strength curve 714, at the highest TFC level of the four and the highest write strength in this example, no detectable laser mode hop effect manifests on the write strength.

It has been found that these same patterns recur for each head for the same head performing the same write operation under the same operating conditions over its corresponding disk surface, such that laser mode hop mapping and mitigation module 30 in aspects of this disclosure may map and record these curves for each head performing each of one or more write operations, under consistent operating conditions, across up to all the sectors of all the bands of its corresponding disk surface, as further discussed below. Control circuitry 22 of this disclosure may generate graphs analogous to FIG. 7 for any individual head operating over its corresponding disk surface, such as for the five individual heads whose mode hops are shown in FIG. 5, and for any write operation in any or all sectors of any portion or all of the disk surface, under any set of operating conditions, as part of generating individual laser mode hop maps for each individual head of a disk drive, in various examples.

TFC output is one operating parameter of the head, among a number of operating parameters of the head. In a head such as head 318 of FIG. 3 that has two TFC elements, or in examples with other numbers of a plurality of TFC elements, the power output to each of the TFC elements may be an independent operating parameter of the head. The range of operating parameters may also comprise a range of values of power applied to a laser unit of the selected head. The values of power applied to the laser unit may be primarily determined and referenced in terms of a variable other than power, such as current, or another variable, with the understanding that current and power have an inherently related correspondence with each other, such that values of power may be considered to include corresponding values of current, in the applicable engineering context, for example. The power applied to the laser unit, and the power applied to the write element, i.e. the laser power and the write power, are also independent operating parameters of the head, which may be controlled in a laser mode hop mitigation by control circuitry 22.

The operating parameters of the head may determine much of the operating conditions of the head. Control circuitry 22 may incorporate a rotational parameter control (RPC) unit that may output rapidly changeable, fine-grained, feedforward control to all of the operating parameters of the head. In various examples, the RPC unit may freely set each operating parameter of the head independently in each sector. In other examples, the RPC unit may freely set each operating parameter of the head independently in other fine-grained units or portions of the disk surface, which may be parameterized in terms of track lengths (e.g., relative to sectors) or of time. In various examples, laser mode hop mapping and mitigation module 30 may vary any one or more head operating parameters more generally, in any combination of head operating parameters, such as TFC power of each TFC element or other type of fly height actuator, laser power, and write power, for example, to most effectively mitigate laser mode hop effects, in accordance with its determination of the effectiveness of one or more options for laser mode hop mitigations at each mapped laser mode hop.

Graph 700 of FIG. 7 may thus form part of a laser mode hop map that laser mode hop mapping and mitigation module 30 may generate, to characterize and then avoid, cancel out, take advantage of, or otherwise mitigate repeatable, predictable laser mode effects in the operation of the selected head over its corresponding disk surface, in aspects of this disclosure, and as further explained below. The map of graph 700 of FIG. 7 is across one spatial dimension (sectors of a track) and one operating parameter dimension (combined TFC power applied to the head during a consistent, 20-sector-long write operation). Graph 700 may thus form a two-dimensional slice of a larger-dimensional map of laser mode hop effects affecting the head over the disk surface. Laser mode hop mapping and mitigation module 30 may generate the larger-dimensional map of laser mode hop effects for the given disk surface to include the two spatial dimensions of radial and tangential position across the complete disk surface (or any selected portion thereof) and across any one or more sets of defined operating parameters or other operating conditions that may affect the occurrence of laser mode hop (e.g., integrated TFC power as in graph 700, and/or any other operating parameters or other operating conditions). Graph 700 may be a graphical representation of the relevant data depicted, which laser mode hop mapping and mitigation module 30 and/or the rest of control circuitry 22 may store, as vectors, tensors, or any other applicable data format, and in any applicable machine-readable format for its future reference.

Among the inventive insights of this disclosure is that, remarkably, as FIG. 7 shows, in the write strength trajectories at the various TFC power levels, certain operating conditions, at the occurrence of laser mode hop for each of write strength curves 711, 712, 713, respectively, there is an intersection or approximate intersection of the higher, pre-mode hop write power level at the respective TFC power level with the lower, post-mode hope write power level at the next higher TFC power level. In aspects of this disclosure, laser mode hop mapping and mitigation module 30 of control circuitry 22 may take advantage of these intersections of write strength across different TFC power levels across laser mode hops, and modify TFC power, or the operating parameters more generally, across a laser mode hop. In aspects of this disclosure, laser mode hop mapping and mitigation module 30 may superimpose variations in operating parameters of the head over the effects of laser mode hop. In aspects of this disclosure, and as further described below, laser mode hop mapping and mitigation module 30 may thereby largely or completely cancel out, or otherwise mitigate, the variations in write strength otherwise induced by the laser mode hop—even where the laser mode hop is unavoidable by any known technique.

Figure 8A:
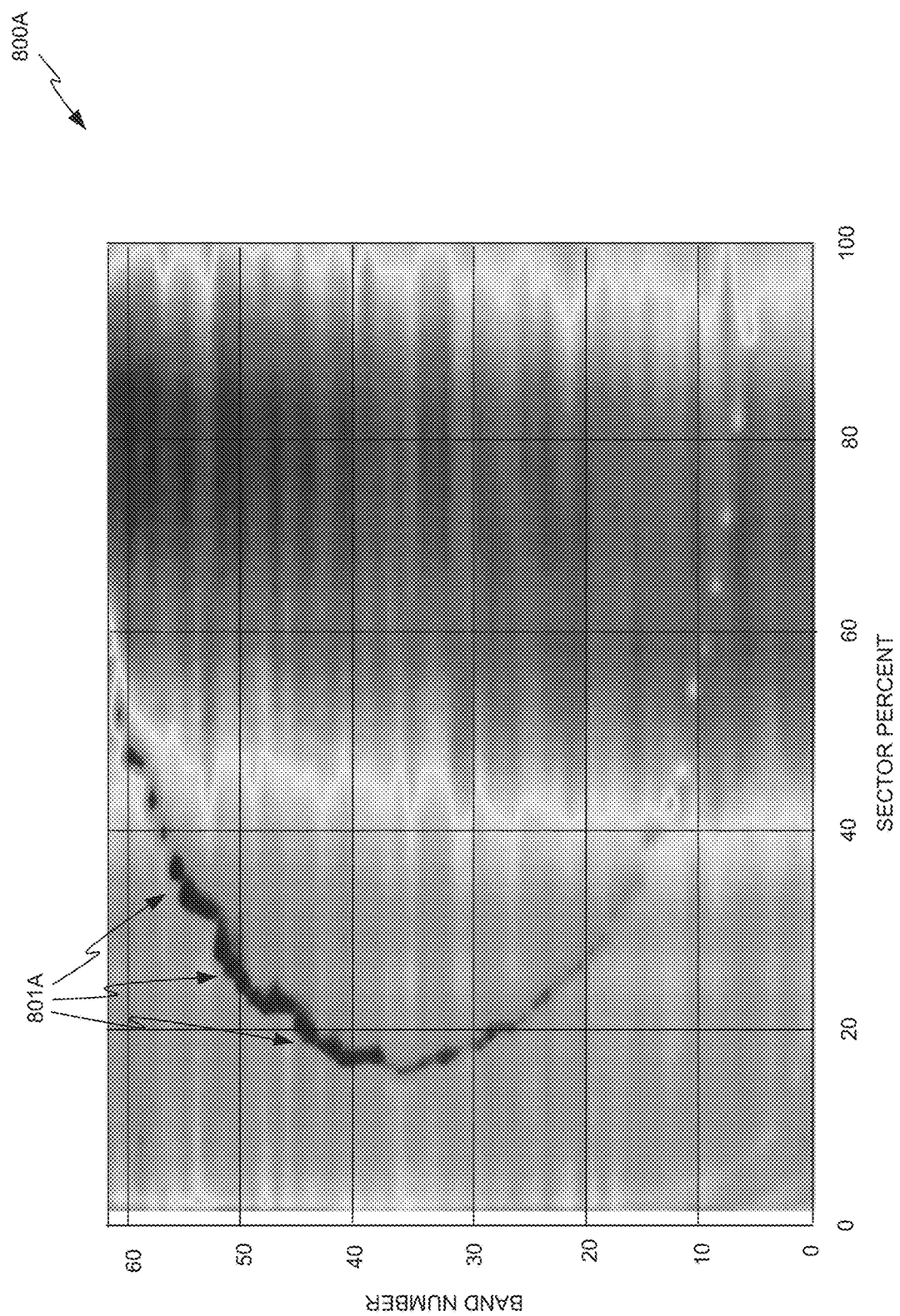
FIGS. 8A and 8B show laser mode hop maps of a selected disk surface at two different temperatures, as a laser mode hop mapping and mitigation module may generate, in accordance with aspects of this disclosure.
Figure 8B:
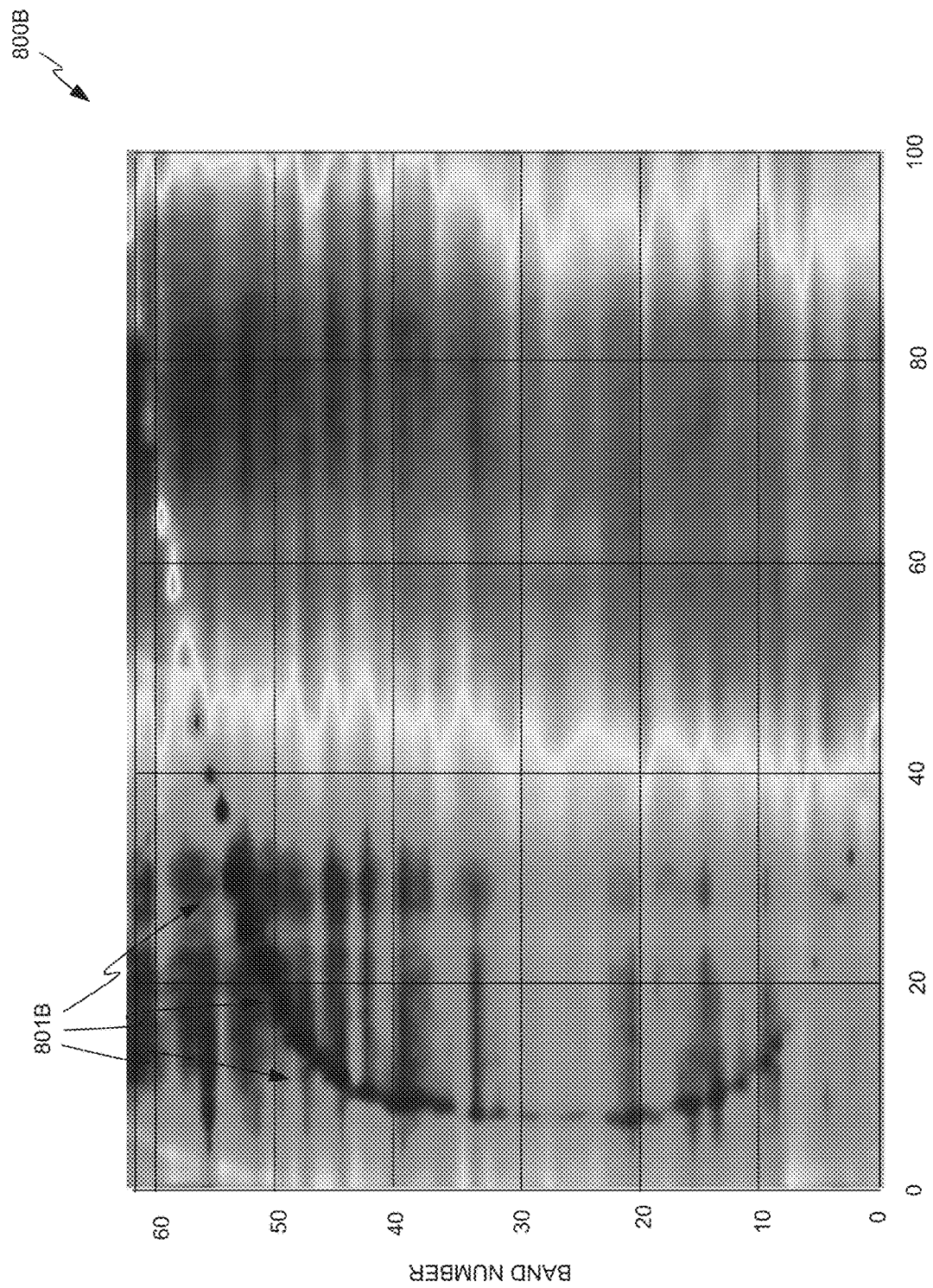

FIGS. 8A and 8B show laser mode hop maps 800A, 800B, respectively, of a selected disk surface at two different temperatures, as laser mode hop mapping and mitigation module 30 may generate, in accordance with aspects of this disclosure. Laser mode hop maps 800A, 800B as depicted in FIG. 8A depict rectangular projections of the entire selected disk surface, with the tangential spatial dimension, in sectors of tracks, along the x axes, with the tracks parallel to the x axes, and the radial spatial dimension, in bands, along the y axes, from the outer diameter (OD) of the disk surface at zero, to the inner diameter (ID) of the disk surface at the maximum band at the top of the y axes. Laser mode hop map 800B is at a higher temperature than laser mode hop map 800A. Laser mode hop maps 800A and 800B respectively show an arcing curve 801A, 801B where mode hop occurs across the disk surface, and show that this mode hop curve moves to the left at higher temperature, and moves to the right at lower temperature, for that head operating over that disk surface. This pattern may be confirmed by further analogous mode hop maps of this disk surface at further example temperatures. The onset of mode hop is dependent on, e.g., laser current and drive temperature. Other example disk surfaces may have multiple analogous mode hop curves.

With mode hop curves mapped out as a function of operating conditions, such as temperature, control circuitry 22 may apply deterministic mitigations of the mode hops. Control circuitry 22 may apply feedforward controls at the locations in each track of mode hops curves 801A, 801B, in some examples. In some examples, if temperature is rising through a mode hop, control circuitry 22 may skip over that mode hop until the temperature is higher. In another example, if the first revolution has lots of mode hops because the temperature is rising and has not yet stabilized, control circuitry 22 may apply a mitigation of waiting until a second or later revolution when the temperature has stabilized, and the mode hop conditions have cleared away, to begin writing. In another example, control circuitry 22 may apply a mitigation by increasing pre-heating of the laser, to begin the first revolution with a higher temperature, so that the temperature will already be stabilized and thereby eliminate mode hops.

The mode hops per temperature can vary greatly from one head and corresponding disk surface to another. Control circuitry 22 may rapidly characterize the mode hops per temperature of each head, and then apply a mitigation of manipulating the temperatures of each head to remain in temperature ranges that are stable against mode hops for each head, in some examples. Control circuitry 22 may perform mode hop mapping of the disk surfaces at different temperatures and other conditions in association with performing defect mapping of the disk surfaces.

Making small adjustments to laser current below or above a default laser current, with other parameters held constant, can thus predictably shift mode hop to the left or right, respectively, across a disk surface and among the sectors in a track, and would also predictably shift track width lower and higher, respectively, if all other parameters were held constant. Control circuitry 22 may also accompany such shifts in laser current with shifts in one or more other parameters such as TFC power and/or temperature/external heat and write parameters, to compensate for the effect of such adjustments in laser current on the track write width, and still write the tracks with nominal track width. NTS temperature correlates very well with write track width, so can be used by control circuitry 22 as an accurate detector of track write width. Control circuitry 22 may use read channel frequency error and raw phase for powerful independent confirmation of mode hops, in combination with the NTS reading and/or the NTS/ECS differential for realtime mode hop detection.

Mode hop maps 800A, 800B may also be used to measure the severity of laser mode hop effects, as initially mapped by laser mode hop mapping and mitigation module 30, prior to mitigation, across the spatial dimensions, for a selected typical write operation, each at a single set of operating parameters (e.g., a temperature, a single selected set of integrated TFC power (e.g., undifferentiated power applied to both TFC elements in an example with two TFC elements in the head), laser power, and write power). The severity of laser mode hop effects may illustratively be measured or parameterized in terms of soft error rate (SER) due to deleterious laser mode hop effects on data write operations, in a custom logarithmic scale of laser mode hop-induced SER. Some areas of the disk surface may be effectively or practically free of laser mode hop effects; some areas of the disk surface may be moderately affected by laser mode hop effects, which have moderately varied and mostly reduced write strength, such that write performance metrics are negatively impacted, prior to laser mode hop mitigation by laser mode hop mapping and mitigation module 30 in aspects of this disclosure; and some areas of the disk surface may be severely affected by laser mode hop effects, which have severely varied and mostly reduced write strength, to the point that those areas of the disk surface may be unusable, other than by way of laser mode hop mitigation by laser mode hop mapping and mitigation module 30 in aspects of this disclosure.

The differences in laser mode hop impacts across the tracks and stroke of the disk surface are driven by a complex set of interacting factors, illustratively including different skew angles of the head across the stroke, differential head operation and write backoff optimization schemes that vary across the stroke, differential heating and TFC efficiency across the stroke, differential disk surface media uniformity across the stroke, and differential linear velocity and data rate across the stroke. Various relations of pre-mitigation laser mode hop may be applicable in various examples, which share in common substantial impact of pre-mitigation laser mode hop in driving anomalous performance, and which are indicative of the inventive value of aspects of the present disclosure.

The depictions in FIGS. 8A, 8B may thus be two two-dimensional slices of a three-or-higher dimensional laser mode hop map, across the two spatial dimensions of radius (or track or sector), and diameter (or stroke or band), across the disk surface, and showing two slices of a map component of a set of TFC power and/or other operating parameters, in various examples. Maps 800A, 800B of FIG. 8 may thus complement graphs 600 and 700 of FIGS. 6 and 7 as differently dimensionally oriented two-dimensional slices of the same larger-dimensional map, sharing one partial spatial dimension in common (radial distance along one track of the disk surface). Laser mode hop mapping and mitigation module 30 may generate and store two or more, or many, such two-dimensional maps of the same selected disk surface at two or more, or many, sets of operating parameters, such as two or more temperatures or two or more values of TFC power, as portions of the larger entire laser mode hop map that control circuitry 22 generates and stores, in various examples.

Laser mode hop mapping and mitigation module 30 may generate and store maps of laser mode hop effects in any one or more combinations of any one or more operating parameters and/or operating conditions, such as TFC power of each TFC element, laser power, write power, operating temperature, or any other operating parameters and/or operating conditions, in various examples. Laser mode hop mapping and mitigation module 30 may thus generate and store a plurality of maps or map portions of laser mode hop effects, and potentially a large number of maps or map portions of laser mode hop effects, analogous to maps 800A, 800B of FIGS. 8A and 8B, for each disk surface, one for each TFC power, or one for each of any other operating parameter, operating condition, type of write operation, or any other combination of operating parameters, operating conditions, types of write operation, and/or any other factors that may affect laser mode hop in the head that corresponds with that disk surface.

In some examples, laser mode hop mapping and mitigation module 30 may be enabled to correlate a soft error rate (SER) with deleterious laser mode hop effects on data write operations, and may map SER as an accurate mapping of deleterious laser mode hop effects on data writes. In some examples, laser mode hop mapping and mitigation module 30 may be enabled to correlate an isolated component or selected category of soft error rate (SER) with deleterious laser mode hop effects on data write operations, and may be enabled to map that component or category of SER as an accurate mapping of deleterious laser mode hop effects on data writes.

Among the inventive insights of this disclosure is that laser mode hop maps 800A, 800B of a selected disk surface, as generated by laser mode hop mapping and mitigation module 30, may function effectively as a map of consistent, predictable laser mode hops in the corresponding selected head over the selected disk surface, performing selected write operations with selected operating parameters. Further, laser mode hop mapping and mitigation module 30 may then use laser mode hop maps of each disk surface, such as laser mode hop maps 800A, 800B, to perform or modify operations to avoid, cancel out, take advantage of, or otherwise mitigate effects of laser mode hop, in the operations of a given head over its corresponding, mapped disk surface.

For example, as noted above with reference to FIG. 7, laser mode hop mapping and mitigation module 30 may use laser mode hop maps, such as laser mode hop maps 800A, 800B and others like them, such as at different TFC power levels and otherwise identical operating parameters or different operating parameters, to identify intersections of nominal write strength across laser mode hops in different TFC power or different operating parameters at the same position on the disk surface. In other words, for example, different maps of the entire disk surface at different TFC power levels may in effect correspond with and form extrapolations of the individual write strength curves 711, 712, 713, 714 of FIG. 7, with one full-disk-surface map analogous to laser mode hop map 800 corresponding with each of the individual write strength curves 711, 712, 713, 714 of FIG. 7. Laser mode hop mapping and mitigation module 30 may use these full-disk-surface maps to identify any or all intersections of identical or near-identical or nominal write strength levels across laser mode hops at different TFC power levels, or different laser current levels, or at any other combinations of operating parameters, to identify when and where to modify the TFC power and/or any other operating parameters to counteract, avoid, cancel out, or otherwise mitigate laser mode hop during a write operation, in effect skipping from one mapped write strength curve to another or from one write strength map to another at a point of intersection of write strength power across a laser mode hop across TFC power and/or other operating parameters, in various examples.

Figure 9:
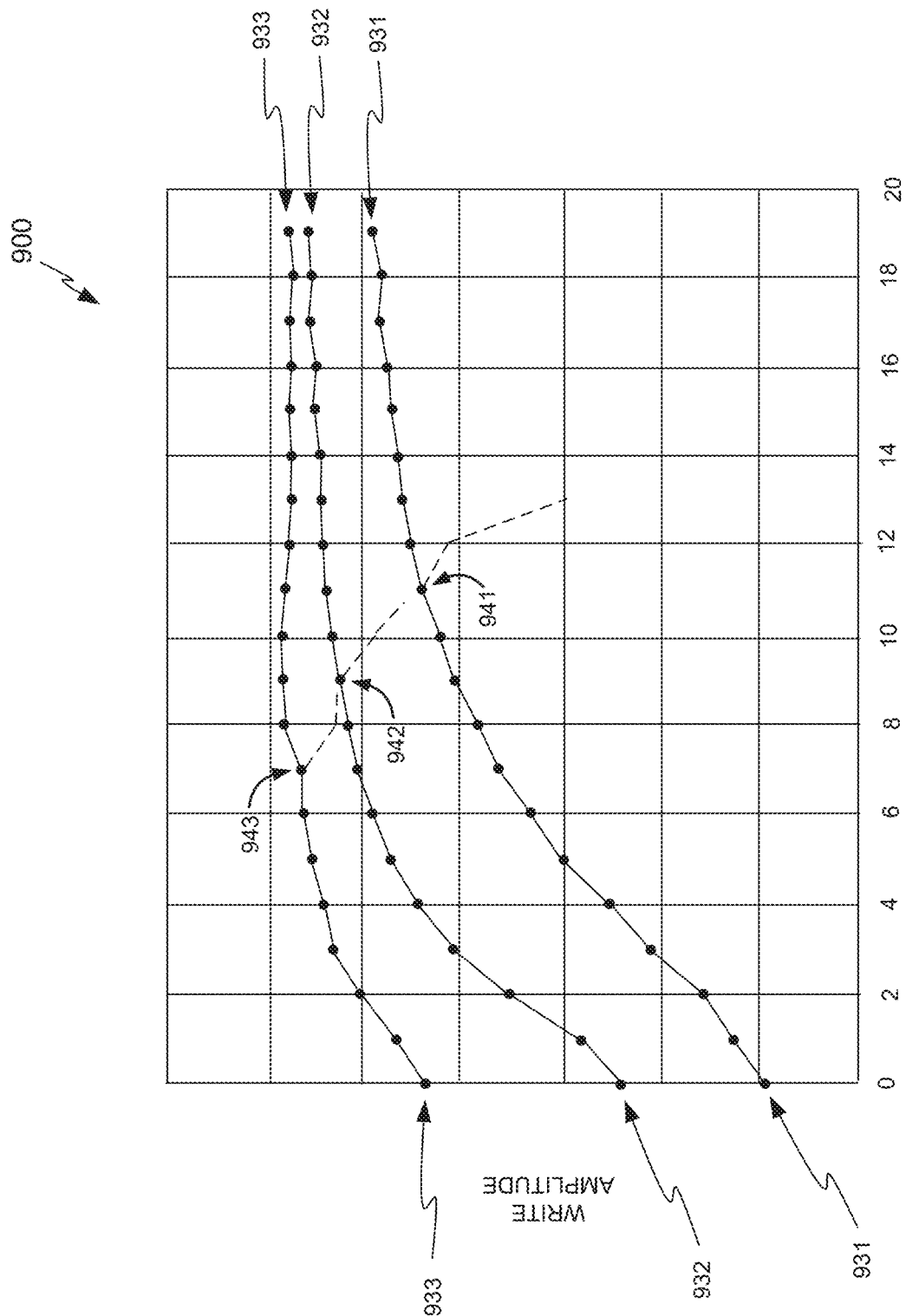
FIG. 9 shows a graph of write strength of a head under control of control circuitry including a laser mode hop mapping and mitigation module, over sector positions along a track along a disk surface, with the laser mode hop mapping and mitigation module outputting laser mode hop mitigation control outputs to the head, including sudden increases in TFC power to largely or completely counteract or cancel out sudden drops in write strength due to laser mode hop, in accordance with aspects of this disclosure.

FIG. 9 shows a graph 900 of write strength of a head under control of control circuitry 22 including laser mode hop mapping and mitigation module 30, over sector positions along a track along a disk surface, with laser mode hop mapping and mitigation module 30 outputting laser mode hop mitigation control outputs to the head, including sudden increases in TFC power to largely or completely counteract or cancel out sudden drops in write strength due to laser mode hop, in accordance with aspects of this disclosure. For illustrative purposes, FIG. 9 shows control circuitry 22 controlling the same head performing a similar write operation over the same track and sectors as shown in FIG. 7, only now, implementing laser mode hop mitigation, taking advantage of the previously generated and stored laser mode hop map as depicted in graph 700.

For example, control circuitry 22 including laser mode hop mapping and mitigation module 30 may control the selected head to perform a write operation along write strength curve 931, beginning at a first TFC power level, corresponding to the TFC power level of write strength curve 711 of FIG. 7. Then, at point 941 in the write strength trajectory, at a time corresponding to the head's flight over sector 11, laser mode hop mapping and mitigation module 30 boosts the TFC power to the head to the second TFC power level discussed with reference to FIG. 7, the power level of the write strength curve 712. In this manner, laser mode hop mapping and mitigation module 30 causes the head's write strength curve 931 to jump over the intersection of write strength curves of the different TFC power levels at the moment of laser mode hop, and maintain a smooth write strength trajectory from point 941 onward for the rest of write strength trajectory 931, rather than suddenly falter due to laser mode hope (shown in dashed lines extending downward from point 941), thereby largely or completely counteracting or canceling out the effect of laser mode hop on the write strength curve 931 of the write operation. This is despite that the predicted laser mode hop still occurs beginning at point 941, when the head is in flight over sector 11. That is, laser mode hop mapping and mitigation module 30 performs a mitigation at point 941 which counteracts the effect of the laser mode hop, despite that the laser mode hop still occurs.

Similarly, in another example, control circuitry 22 including laser mode hop mapping and mitigation module 30 may control the selected head to perform a write operation along write strength curve 932, beginning at the selected second TFC power level, corresponding to the TFC power level of write strength curve 712 of FIG. 7. Then, at point 942 in the write strength trajectory, at a time corresponding to the head's flight over sector 9, laser mode hop mapping and mitigation module 30 boosts the TFC power to the head to the third discussed TFC power level, the power level of the write strength curve 713. In this manner, laser mode hop mapping and mitigation module 30 causes the head's write strength curve 932 again to jump over the intersection of write strength curves of the different TFC power levels at the moment of laser mode hop, rather than suddenly falter due to laser mode hope (shown in dashed lines descending from point 942), thereby largely or completely counteracting or canceling out the effect of laser mode hop on the write strength curve 932 of the write operation. Likewise, in the example of write strength curve 933, control circuitry 22 including laser mode hop mapping and mitigation module 30 may control the selected head to perform a write operation, beginning at the selected third TFC power level, corresponding to the TFC power level of write strength curve 713 of FIG. 7, and then, at point 943 in write strength curve 933, at a time corresponding to the head's flight over sector 7, boosting the TFC power to the head to the fourth discussed TFC power level, the power level of the write strength curve 713. In this manner, again, laser mode hop mapping and mitigation module 30 causes the head's write strength curve 933 to jump over the intersection of write strength curves of the different TFC power levels at the moment of laser mode hop, rather than suddenly decrease due to laser mode hope (shown in dashed lines descending from point 943), thereby largely or completely counteracting or canceling out the effect of laser mode hop on the write strength curve of the write operation.

In other examples, laser mode hop mapping and mitigation module 30 may determine to perform a boost in laser current, or in write element current, or in any combination of TFC current, laser current, write element current, and/or any other applicable operating parameter, and generate analogous mitigations of laser mode hop effects as shown in FIG. 9. While write strength curves 931, 932, 933 increase approximately asymptotically over time, in these example write operations, rather than being flat at a constant write strength, due to rising approximately asymptotically toward a steady-state temperature from a cooler starting temperature before the write element and the laser are activated for the write operation, these smooth asymptotic rises in write strength with other parameters constant are able to be addressed effectively by various means, unlike the sudden, more complex variations in write strength due to laser mode hop. Thus, counteracting or mitigating laser mode hop effects to achieve smooth strength curves such as write strength curves 931, 932, 933 by laser mode hop mapping and mitigation module 30 in accordance with various examples of this disclosure may provide an effective solution for laser mode hop effects.

Laser mode hop mapping and mitigation module 30 may perform and implement analogous examples of modifying integrated TFC power up or down, or modifying any one or more of individual TFC unit power levels, laser power, write power, and/or any other operating parameters, to counteract, cancel out, avoid, take advantage of, or otherwise mitigate laser mode hop effects anywhere across the disk surface, using complete or otherwise sufficient maps of the disk surface analogous to FIG. 8, to implement mitigations such as applying feedforward boosts to TFC power levels to counteract sudden drops of power induced by laser mode hop as in the examples of FIG. 9, or to implement any other mitigations of laser mode hop, depending on the variations available at any disk surface position due to any combination of operating parameters and/or other operating conditions, illustratively such as varying operating parameters to connect write strength trajectories across intersections or near-intersections of write strength curves, at each disk surface position.

In some examples, laser mode hop mapping and mitigation module 30 may select a mitigation in the form of varying the laser power, which has been found to operate advantageously in counteracting the sudden changes in the laser emission amplitude due to laser mode hop. In some illustrative examples that have been tested, increasing or decreasing the current applied to the laser unit by in the range of half a milliamp has been effective at counteracting sudden decreases or increases, respectively, in the laser emission amplitude and in the write strength due to laser mode hop. Other values for change in current greater or less than this specific illustrative example may be applicable in other implementation examples, and depending on and calibrated toward the magnitudes of the write strength changes that laser mode hop mapping and mitigation module 30 detects and observes at each point and set of conditions in generating its map of laser mode hop effects.

In some examples, laser mode hop mapping and mitigation module 30 may select an optimal laser mode hop mitigation for each sector or other position on the disk surface, and potentially for each write operation and initial set of operating parameters, and may encode the RPC unit with variations of one or more operating parameters to implement in the operation of the head at the applicable sector. The RPC unit may then be enabled to generate feedforward head control signals or otherwise implement any variations in operating parameters of the head at each sector or other position, in accordance with the mitigation determinations made by laser mode hop mapping and mitigation module 30. In any of these laser mode hop mitigation methods, techniques, or systems, control circuitry in examples of this disclosure may thus reduce or eliminate variations in write strength, fly height, or any other relevant performance aspect due to laser mode hop, and may improve disk drive reliability and/or improve data density (e.g., as may be measured in terms of tracks per inch and/or bands per inch (TPI/BPI)) over those of analogous HAMR disk drives with laser mode hop effects left unmitigated in the absence of aspects of this disclosure.

In various examples, laser mode hop mapping and mitigation module 30 may generate laser mode hop maps for each disk surface, and determine, assign, and record, such as in a lookup table, laser mode hop mitigations for each sector or other positions of each disk surface, and for any number of selected write operations and operating parameters and/or other operating conditions, for which a significant, predictable laser mode hop occurs, and for which a mitigation may be helpful, based on the laser mode hop maps. In various examples, laser mode hop mapping and mitigation module 30 may generate the laser mode hop maps and determine and record laser mode hop mitigations as part of an in-factory manufacturing, formatting, and/or calibration process.

In various examples, laser mode hop mapping and mitigation module 30 may thus be configured to generate the map of laser mode hop effects across the corresponding disk surface across a range of operating conditions of the selected head. The range of operating conditions may include any of a range of values of current applied to one or more thermal fly height control (TFC) units of the selected head, a range of values of current applied to a laser unit of the selected head, a range of values of current applied to a write element of the selected head, a range of temperatures of a portion of the selected head proximate to a near-field transducer (NFT) of the selected head, other ranges of conditions, or any combination thereof, in various examples. Generating the map of laser mode hop effects may include operating a selected head across the corresponding disk surface in a plurality of operating conditions of the selected head; detecting laser mode hop effects of the head operating over the disk surface; and recording, e.g., in a lookup table, positions of the selected head relative to the corresponding disk surface and operating conditions at which the laser mode hop effects are detected. Laser mode hop mapping and mitigation module 30 may thus be configured to generate a lookup table of mitigation parameter modifications relative to positions of the disk surface, based on the map. Applying the laser mode hop mitigation may include laser mode hop mapping and mitigation module 30 reading and applying a mitigation parameter modification from the lookup table to the selected head, at a corresponding position of the disk surface, at which the applied mitigation parameter modification is indicated by the lookup table.

As part of generating and recording the laser mode hop maps and/or mitigations, laser mode hop mapping and mitigation module 30 may measure and record temperature of the vicinity of the NFT and write element of the head, e.g., from the NTS, or as the NTS minus ECS differential, versus laser power, for various tracks and zones, and for various values of TFC power and of laser power, and potentially of other operating conditions such as ambient interior temperature of the disk drive, in various examples. The observed NFT-proximate temperature may be an accurate proxy for write strength, or at least given a constant or corrected-for set of other applicable conditions, in various examples. Laser mode hop mapping and mitigation module 30 may record sudden, unpredicted changes in NFT-proximate temperature at constant laser power as indications of laser mode hops at the corresponding positions and conditions, in various examples.

Such sudden changes in NFT-proximate temperature at constant laser power may be thought of in terms of a temperature resistance threshold, e.g., in that the NFT-proximate temperature fails to respond as expected in the absence of laser mode hop to an ongoing trajectory over time at a given TFC power and laser power, and such that a boost in TFC power or laser power or other one or more operating parameters may be selected as a mitigation to the temperature resistance threshold observed as induced by the laser mode hop. Any of the observed sudden drops in NFT-proximate temperature, such as may correspond to the example sudden drops in write strength 721, 722, 723 in FIG. 3, induced by laser mode hop, may be referred to as temperature resistance thresholds. Some laser mode hops may also induce a sudden increase in NFT-proximate temperature and write strength, and laser mode hop mapping and mitigation module 30 may also map and determine mitigations for such sudden jumps in write strength, such as by assigning indications to perform a decrease of TFC power and/or a decrease in laser power and/or a decrease in write element power at the sector at which a predictable laser mode hop-induced sudden increase in temperature and write strength is mapped.

As part of generating and recording the laser mode hop maps and/or mitigations, laser mode hop mapping and mitigation module 30 may also determine one or more corrections due to long-term fly height (LTFH) change over time (e.g., due to long-term changes in fly height responsiveness of the head due to long-term changes in conditions of the head, such as changes to the crown and camber of the air-bearing surface (ABS) of the head and/or otherwise to the shapes of aerodynamic surfaces of the head over the course of predictable wear-and-tear), and/or may apply and record forecasted corrections for LTFH change to the laser mode hop maps and/or mitigations. For example, laser mode hop mapping and mitigation module 30 may record maps and/or mitigations with corrections for LTFH applied along a forecasted schedule of LTFH-induced changes in laser mode hop responsiveness of the head. In some examples, this may include laser mode hop mapping and mitigation module 30 subtracting a forecasted LTFH correction term from temperature response measurement data, e.g., from the NTS or from the NTS-ECS differential, for maps and/or mitigations to be referenced and applicable at the future operating times at which the forecasted LTFH effects are predicted to occur. In an illustrative example, laser mode hop mapping and mitigation module 30 may forecast for nominal fly height at an otherwise constant set of operating parameters and conditions to descend slowly and asymptotically over a set significant number of revolutions, and may record indications to subtract a matching correction as a function of how far along that LTFH curve the head has progressed relative to the number of revolutions of the disk surface it has experienced in its operations. Laser mode hop mapping and mitigation module 30 may thus be configured to determine an LTFH change of a selected head, and apply a correction to at least one of the map of laser mode hop effects and/or the laser mode hop mitigation based on the predicted LTFH change of the selected head, in various examples.

Laser mode hop mapping and mitigation module 30 may generate and record the laser mode hop maps and/or mitigations in the form of one or more lookup tables, in various examples. Laser mode hop mapping and mitigation module 30 may generate a lookup table for laser mode hop effects, e.g., in the form of NTS/ECS resistance thresholds, for any or all sectors or other positions of a disk surface, and any or all applicable operating parameters and/or other operating conditions, such as ambient disk drive temperature, laser current, write current, and TFC current of each TFC element of the head. In some examples, laser mode hop mapping and mitigation module 30 may map laser mode hops across the disk surface at a selected representative sample of operating parameters and conditions, and then determine extrapolations from those observed data to populate approximations of any or all other sets of operating parameters and conditions. It has been found that such extrapolations from sufficient representative samples of operating parameters and conditions for laser mode hops across the disk surface may be accurate and successful in mapping laser mode hops in intermediate or other operating parameters and conditions for which laser mode hop mapping and mitigation module 30 has not collected observational data, for many or all applicable sets of operating parameters and conditions of useful interest in the operation of the disk drive.

Laser mode hop mapping and mitigation module 30 may select any of a number of types of mitigations for laser mode hop effects. As described above, laser mode hop mapping and mitigation module 30 may select a mitigation to feedforward increase or decrease integrated TFC power (uniformly applied to each of two or more TFC units), or may increase or decrease operating parameters in any combination of one or more of individual TFC unit power levels, laser power, write power, and/or any other operating parameters that may affect the internal physics of the laser unit of the head, to counteract or otherwise mitigate a sudden decrease or increase in NFT-proximate temperature and write strength. This may also be thought of as counteracting the corresponding temperature resistance threshold. In some examples, mitigation may take the form of laser mode hop mapping and mitigation module 30 increasing or decreasing the laser power and/or the write element power, rather than the TFC power or fly height control aspects, to counteract or compensate for the sudden loss or gain, respectively, of the laser emission amplitude due to the laser mode hop. In other examples, mitigation may take the form of laser mode hop mapping and mitigation module 30 stopping or otherwise modifying a write operation, at or proximate to a position of laser mode hop effect, such as by skipping over one or more sectors or other sections of track at which laser mode hop effects are mapped.

Identifying a modification of laser current, TFC current, write current, or any other operating parameter that may counteract a laser mode hop effect, may thus involve laser mode hop mapping and mitigation module 30 identifying a laser mode hop effect at an identified position on the disk surface, at a first set of operating conditions of the selected head (e.g., the laser current, TFC current, or any other operating parameter or combination thereof, prior to the laser mode hop); and identifying a second set of operating parameters of the selected head at the identified position which counteract the identified laser mode hop effect at the identified position (e.g., the increase or decrease in laser current, TFC current, or any other operating parameter or combination thereof, to mitigate the laser mode hop). Laser mode hop mitigation points 941, 942, and 943 in write strength trajectories 931, 932, and 933 thus each represent an example of laser mode hop mapping and mitigation module 30 identifying a laser mode hop effect at an identified position on the disk surface, at a first set of operating conditions of the selected head, identifying a second set of operating parameters of the selected head at the identified position which counteract and mitigate the identified laser mode hop effect at the identified position, and implementing a transition of the operating parameters of the head to the second set of operating parameters, which thereby performs a mitigation of the identified laser mode hop effect at the identified position.

The identified second set of operating parameters may include a modified power applied to a laser unit of the head, and applying the laser mode hop mitigation may include modifying the power applied to the laser unit as in the identified second set of operating parameters at the identified position. The identified second set of operating parameters may include a modified power applied to one or more thermal fly height control (TFC) units of the head, and applying the laser mode hop mitigation may include modifying the power applied to the one or more TFC units as in the identified second set of operating parameters at the identified position. In some examples, the identified second set of operating parameters may include a modified power applied to a write element of the head, and applying the laser mode hop mitigation may include modifying the power applied to the write element as in the identified second set of operating parameters at the identified position. In some examples, the identified second set of operating parameters may include any combination of the operating parameters, and applying the laser mode hop mitigation may include modifying any combination of the operating parameters at the identified position to mitigate the laser mode hop effect at the identified position. In some examples, applying the laser mode hop mitigation may also include interrupting or otherwise modifying a write operation at the identified position.

In some examples, laser mode hop mapping and mitigation module 30 may continue to update or perform new or ongoing laser mode hop mapping and/or mitigation determinations in in-field use, or in use by users, after the original in-factory laser mode hop mapping and mitigation determinations. Laser mode hop mapping and mitigation module 30 may thereby further refine the laser mode hop map and/or the determinations of laser mode hop mitigations to apply at one or more positions of the map, and at one or more sets of operating conditions. Laser mode hop mapping and mitigation module 30 may take advantage of further opportunities to observe laser mode hop effects in previously untested sets of operating parameters and/or conditions and record those new data, and use them to add data and update fields and to update and refine the existing laser mode hop maps and/or assigned mitigation operations. This may include collecting data in realtime during user operations, including in read operations, with servo harmonic sense (SHMS) operations, which use servo fields to measure NTS or ECS during write operations. Laser mode hop mapping and mitigation module 30 may perform such collecting further data and updating and refining its laser mode hop maps and/or mitigations in operations superimposed on normal data read/write operations, without impacting performance characteristics of nominal operations for the user, in various examples. Laser mode hop mapping and mitigation module 30 may thus refine at least one of the map of laser mode hop effects and determinations of the laser mode hop mitigation based on further data acquired in in-field use of the data storage device, after initially generating the map of laser mode hop effects.

In different examples, laser mode hop mapping and mitigation module 30 may collect ongoing data during operations once per sector, or 20 times per sector, or at any other frequency, and either constantly, or for a select period of time, or intermittently, in different examples. Ongoing in-field refinement of laser mode hop maps and/or mitigations by laser mode hop mapping and mitigation module 30 may remain under the control of control circuitry 22 in various examples, and/or may be exposed to host control by host 44 in various examples.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position a selected head among one or more heads proximate to a corresponding disk surface among the one or more disks; and
   one or more processing devices, configured to:
      generate a map of laser mode hop effects across the corresponding disk surface, for the selected head; and
      apply a laser mode hop mitigation in operating the selected head, based on the map of laser mode hop effects,
   wherein the one or more processing devices are further configured to generate the map of laser mode hop effects across the corresponding disk surface across a range of operating conditions of the selected head.

2. The data storage device of claim 1, wherein the range of operating conditions comprises a range of values of current applied to one or more thermal fly height control (TFC) units of the selected head.

3. The data storage device of claim 1, wherein the range of operating conditions comprises a range of values of current applied to a laser unit of the selected head.

4. The data storage device of claim 1, wherein the range of operating conditions comprises a range of values of current applied to a write element of the selected head.

5. The data storage device of claim 1, wherein the range of operating conditions comprises a range of temperatures of a portion of the selected head proximate to a near-field transducer (NFT) of the selected head.

6. A data storage device, comprising:
   one or more disks;
   an actuator mechanism configured to position a selected head among one or more heads proximate to a corresponding disk surface among the one or more disks; and
   one or more processing devices, configured to:
      generate a map of laser mode hop effects across the corresponding disk surface, for the selected head; and
   apply a laser mode hop mitigation in operating the selected head, based on the map of laser mode hop effects, wherein generating the map comprises:
      identifying a laser mode hop effect at an identified position on the disk surface, at a first set of operating parameters of the selected head; and
      identifying a second set of operating parameters of the selected head at the identified position which counteract the identified laser mode hop effect at the identified position.

7. The data storage device of claim 6, wherein the identified second set of operating parameters comprises a modified power applied to a laser unit of the head, and
   wherein applying the laser mode hop mitigation comprises modifying the power applied to the laser unit as in the identified second set of operating parameters at the identified position.

8. The data storage device of claim 6, wherein the identified second set of operating parameters comprises a modified power applied to one or more thermal fly height control (TFC) units of the head, and
   wherein applying the laser mode hop mitigation comprises modifying the power applied to the one or more TFC units as in the identified second set of operating parameters at the identified position.

9. The data storage device of claim 6, wherein the identified second set of operating parameters comprises a modified power applied to a write element of the head, and
   wherein applying the laser mode hop mitigation comprises modifying the power applied to the write element as in the identified second set of operating parameters at the identified position.

10. The data storage device of claim 6, wherein applying the laser mode hop mitigation comprises modifying a write operation at the identified position.

11. The data storage device of claim 1, wherein generating the map of laser mode hop effects comprises:
operating the selected head across the corresponding disk surface in a plurality of operating conditions of the selected head;
detecting laser mode hop effects; and
recording positions of the selected head relative to the corresponding disk surface and operating conditions at which the laser mode hop effects are detected.

12. A data storage device, comprising:
one or more disks;
an actuator mechanism configured to position a selected head among one or more heads proximate to a corresponding disk surface among the one or more disks; and
one or more processing devices, configured to:
generate a map of laser mode hop effects across the corresponding disk surface, for the selected head; and
apply a laser mode hop mitigation in operating the selected head, based on the map of laser mode hop effects, and
wherein the one or more processing devices are further configured to:
determine a predicted long-term fly height (LTFH) change of the selected head; and
apply a correction to at least one of the map of laser mode hop effects, and the laser mode hop mitigation, based on the predicted LTFH change of the selected head.

13. The data storage device of claim 1, wherein generating the map of laser mode hop effects comprises:
reading a signal from a near-field transducer thermal sensor (NTS) of the selected head;
reading a signal from an embedded contact sensor (ECS) of the selected head;
determining an NTS-ECS differential based on the signal from the NTS and the signal from the ECS; and
measuring the laser mode hop effects based at least in part on the NTS-ECS differential.

14. The data storage device of claim 1, wherein the one or more processing devices are further configured to generate a lookup table of mitigation parameter modifications relative to positions of the disk surface, based on the map,
wherein applying the laser mode hop mitigation comprises reading and applying a mitigation parameter modification from the lookup table to the selected head, at a corresponding position of the disk surface.

15. The data storage device of claim 1, wherein the one or more processing devices are further configured to refine at least one of the map of laser mode hop effects, and determinations of the laser mode hop mitigation, based on further data acquired in in-field use of the data storage device, after initially generating the map of laser mode hop effects.

16. A method comprising:
generating, by one or more processing devices, for a selected head of a data storage device operating proximate to a corresponding disk surface, a map of laser mode hop effects across the corresponding disk surface across a range of operating conditions of the selected head, wherein the disk surface comprises an outer surface layer and a volume of disk matter beneath the outer surface layer; and
applying, by the one or more processing devices, a laser mode hop mitigation in operating the selected head, based on the map of laser mode hop effects.

17. The method of claim 16, wherein applying the laser mode hop mitigation comprises modifying one or more of: a current applied to one or more thermal fly height control (TFC) units of the selected head; a current applied to a laser unit of the selected head; and a current applied to a write element of the selected head.

18. One or more processing devices comprising:
means for generating a map of laser mode hop effects for a selected head operating across a corresponding disk surface of a data storage device, and across a range of operating conditions of the selected head;
means for determining a set of mitigation parameter modifications relative to positions of the disk surface, based on the map of laser mode hop effects; and
means for applying a laser mode hop mitigation in operating the selected head at a selected position, among the positions of the disk surface, based on the set of mitigation parameter modifications relative to positions of the disk surface.

19. The one or more processing devices of claim 18, wherein applying the laser mode hop mitigation comprises modifying one or more of: a current applied to one or more thermal fly height control (TFC) units of the selected head; a current applied to a laser unit of the selected head; and a current applied to a write element of the selected head.

* * * * *